July 4, 1950          P. W. WINKELMANN          2,514,272
WINDOW REGULATOR WITH AUXILIARY MANUAL CONTROL
Filed Nov. 29, 1945          2 Sheets-Sheet 1
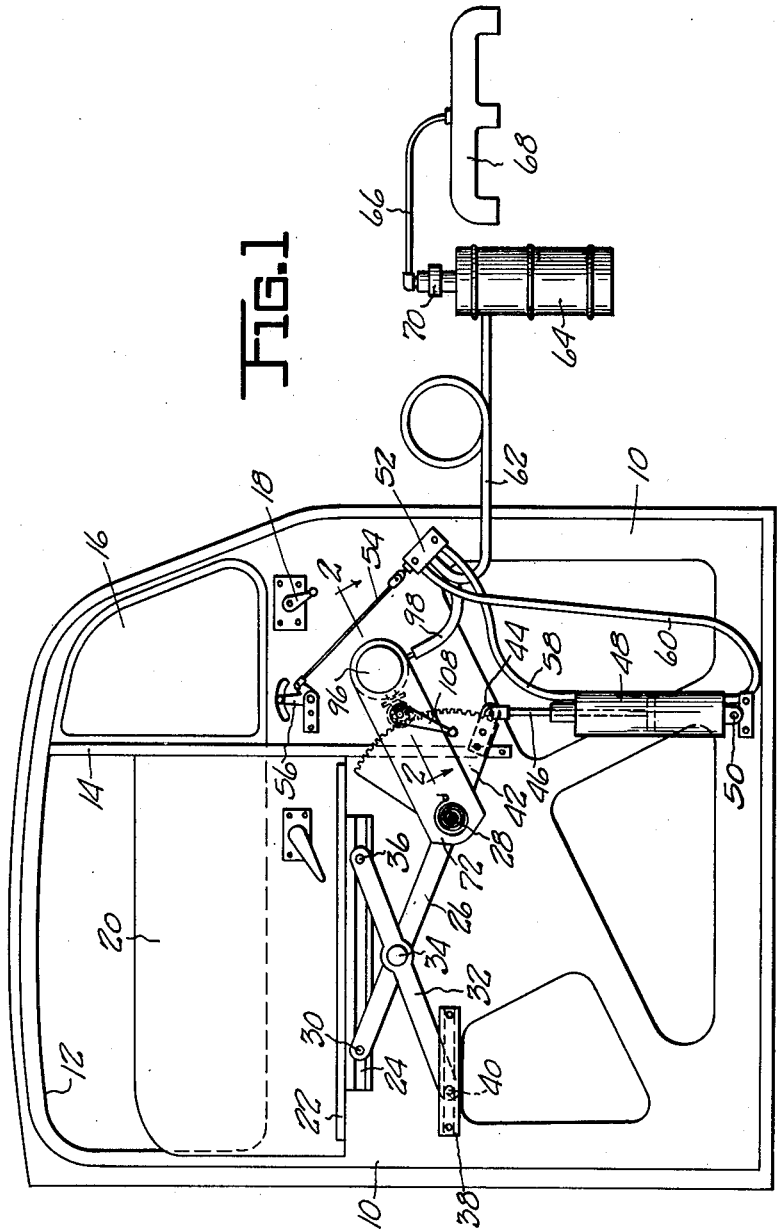
INVENTOR.
PAUL W. WINKELMANN.
BY
Oltsch & Knoblock.
ATTORNEYS.

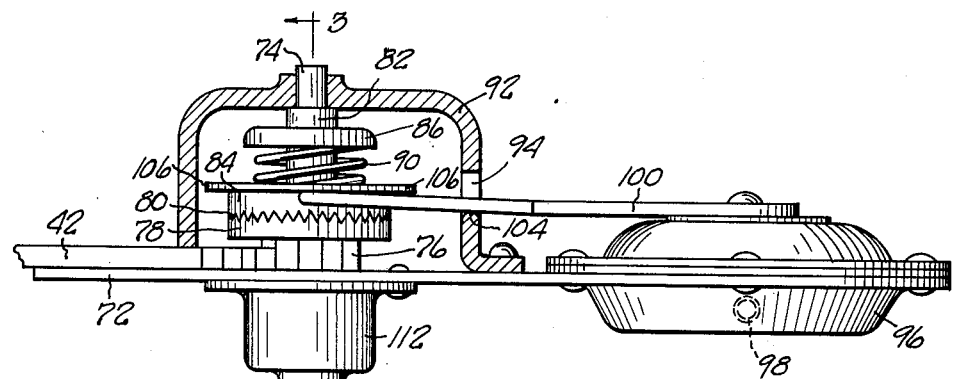
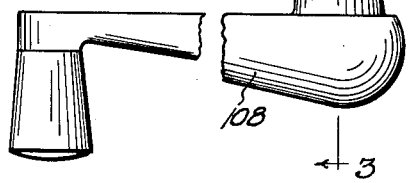
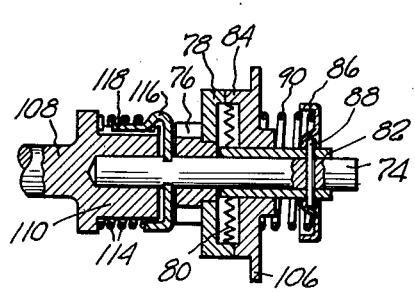
Paul W. Winkelmann.
INVENTOR.
BY Oltsch & Knoblock
ATTORNEYS.

Patented July 4, 1950

2,514,272

UNITED STATES PATENT OFFICE 2,514,272

WINDOW REGULATOR WITH AUXILIARY MANUAL CONTROL

Paul W. Winkelmann, South Bend, Ind.

Application November 29, 1945, Serial No. 631,561

2 Claims. (Cl. 268—125)

This invention relates to window operating devices, and particularly to power operated devices for raising and lowering automobile windows.

Various types of power operated devices for raising and lowering automobile windows have been proposed. Some are effective for their intended purpose, but all have limitations, some of which are serious. Thus, it is customary to eliminate manually operable window operating means or to provide them in normally disengaged relation. In the case of devices of the vacuum operated type which lack manually operable means, it is necessary that the automobile engine be operating before the windows can be raised or lowered. Of greatest importance, however, is the fact that the lack of provision for manual operation of the windows presents a serious hazard in case of an accident which disables the power operated device and in which the automobile doors become jammed. Thus, in case of an upset, it may not be possible to open the car doors or to energize the window operating device. The occupants of the automobile will therefore be trapped. The hazard involved becomes most evident when it is considered that fires frequently follow and result from serious accidents such as collisions and upsets. The same hazards occur where normally disengaged manually operable means are provided, to at least some extent, because of the difficulty of adjusting the means to operative position and simultaneously operating the same.

The primary object of this invention is to provide a power actuated window operator and an auxiliary manually controlled operator, in which the power actuated device automatically disengages the manual device upon actuation thereof and automatically re-engages said manual device upon de-energization thereof.

Other objects will be apparent from the description and appended claims.

In the drawings:

Fig. 1 is an interior view of an automobile door mounting my device and also illustrates certain parts of the device located outside of the door.

Fig. 2 is an enlarged detail view of the manually operable portion of my device with parts shown in section.

Fig. 3 is a fragmentary detail sectional view taken on line 3—3 of Fig. 2.

Referring to the drawings, which illustrate the preferred embodiment of the invention, the numeral 10 designates an automobile door having a window opening 12 in the upper part thereof which is divided by a channel 14. A small window 16 pivoted on a vertical axis and operable by a crank 18 fits in the front part of the window opening. A comparatively large window pane 20 is adapted to span and close the remainder of the window opening. Window pane 20 is mounted slidably in vertical guide channels and is adapted to be lowered into a well within the body of the door. A frame member 22 is secured to and supports the window at its lower end and preferably includes an elongated horizontal channel or track 24. An elongated arm 26 is pivoted to the door at 28, the upper end of said arm journaling a roller 30 which is adapted to traverse the track 24. A second elongated arm 32 is pivoted at 34 to arm 26 and its upper end journals a roller 36 adapted to traverse the track 24. A second horizontal channel or track 38 is secured to the door below track 22 at the same level as pivot 28. A roller 40 journaled on the lower end of arm 32 is adapted to traverse the track 38. A large gear segment 42 is journaled on pivot 28, and arm 26 is fixedly secured thereto. A lug 44 projects from the segment 42 in alignment with arm 26 and a rod 46 is pivoted thereto. An elongated cylinder 48 is pivoted to the door at its lower end at 50 below the lug 44. A suitable piston fits in the cylinder and rod 46 is connected to said piston.

A valve 52, preferably of the three-way or three-position type, is mounted in the door. Valve 52, preferably has a shiftable apertured plate type valve element with which an actuating rod 54 is connected. Any suitable controller 56, such as a bellcrank lever, is connected to and controls the position of rod 54. A conduit 58 is connected to one end of the cylinder 48 and to valve 52. A second conduit 60 is connected to the opposite end of cylinder 48 and to valve 52. A flexible conduit 62 is connected at one end to the intermediate portion of valve 52 and extends through an opening in the pivoted edge of the door to a suitable reservoir 64. The reservoir is connected by a conduit 66 with the intake manifold 68 of the automobile engine (not shown), and is preferably provided with a check valve 70.

The operation of the power actuated device is controlled by the setting of controller 56. The same is shown in Fig. 1 in its intermediate or inoperative position. When the controller is shifted to one of its two opposed operating positions, the valve 52 is adjusted to place one of the two conduits 58—60 in communication with the conduit 62 whereby the suction or vacuum effect generated at the intake manifold 68 acts upon the piston in the cylinder 48 to actuate the same and longitudinally shift the rod 46. The shifting of rod 46 pivots the crossed levers 26 and 32 and serves to raise or lower the window, with incident movement of the rollers 30, 36 and 40 in the tracks 24 and 38 as will be obvious.

Referring now to the means by which the window may be operated manually. A plate 72 is mounted in the door adjacent to the gear segment 42. A shaft 74 extends through this plate and journals a pinion 76 which meshes with the gear teeth of segment 42. A cup-shaped clutch member 78 having peripheral clutch teeth 80 is fixedly secured to the hub of pinion 76. A sleeve 82 encircles shaft 74 and has a non-circular outer shape. A second cup-shaped clutch member 84 has peripheral clutch teeth 80 complementary to and adapted to interengage with the teeth of member 78. The clutch member 84 has a contoured central opening conforming with the shape of sleeve 82 or is otherwise keyed, and is axially slidable on said sleeve. An abutment member 86 encircles the outer end of sleeve 82 and is anchored by a pin 88 which passes through said sleeve and through the shaft 74. A coil spring 90 encircles the shaft 74 and urges the clutch member 84 into operative clutched engagement with clutch member 78. A housing 92 is secured to the plate 72 to house the clutch and associated parts and has an opening 94 therein.

A diaphragm unit 96 is mounted on plate 72 adjacent to the housing 92 and is connected by a conduit 98 with the valve 52 in a manner to be open to atmosphere when the valve is at its intermediate position and to be connected with suction line 62 when the valve 52 is in either of its two opposed operating positions. The diaphragm unit includes an elongated arm 100 which is responsive to actuation of the diaphragm unit. Arm 100 extends freely through the clutch housing opening 94 and is fulcrumed thereon at 104. The inner arm 100 engages against peripheral flange 106 on clutch member 84.

The end portion of shaft 74 which projects from plate 72 at the side opposite the clutch mounts a crank 108 which has a hub 110 which fits within a housing 112. A coil spring 114 fits within said housing and is normally expanded therein. A fitting 116 is anchored to shaft 74 and has a longitudinally extending tongue 118 positioned in a longitudinal groove in hub 110. Spring 114 encircles the hub 110 and said fitting part and is adapted, upon rotation of crank 108, to effect a clutched driving connection between the crank and the shaft through the fitting 116 while preventing rotation of the crank in the event of rotation of the shaft 74 by other means. This spring clutch arrangement is of the type conventionally used for operating automobile windows.

The operation of this part of the device is as follows: When the valve 52 is adjusted to operating position by control 56 when the automobile engine is operating, the diaphragm unit 96 is subjected to a suction action which rocks the arm 100 upon the fulcrum 102 and thereby presses against the flange 106 of clutch element 84 to disengage the clutch teeth 80. Thus the pinion 76 is free to rotate about the shaft 74 while the power unit 48 is actuated to raise or lower the window 20. During this time the spring 114, being expanded in housing 112, holds the shaft 74 and crank 108 stationary. When the valve is reset at its neutral position, thus deenergizing the diaphragm unit 96, the spring 90 returns the clutch member 84 to clutched engagement with member 78. Consequently, whenever the power unit 48 operates, the crank 108 remains stationary and it does not become a hazard. At all other times the device is conditioned for operation by the crank. Specifically, rotation of crank 108 frees spring 114 from housing 112 and at the same time rotates shaft 74 through engagement of tongue 118 of fitting 116 with a side wall of the tongue-receiving groove in hub 110. As the shaft 74 rotates, the sleeve 82 also rotates by virtue of its pinned connection at 88. The clutch element keyed on said sleeve drives the clutch element 78 and associated pinion 76. Consequently, the window-operating lever 26 which mounts gear segment 42 is operated to raise or lower the window 20. This combination and arrangement of parts insures that means for operating the window are provided under all normal conditions and satisfies the requirements for a safe ready-to-operate manual device and the convenience of a power-operated device.

It will be understood that the construction herein described and illustrated constitutes the preferred embodiment of the invention, and that other embodiments which fall within the scope of the appended claims and the spirit of the invention are contemplated.

I claim:

1. In a cross arm window fluid regulator system, said crossed arms being in a vertical plane and hingedly connected together, one of the arms inclining downwardly and forwardly and being of greater length than the other arm, a vertically disposed pressure cylinder beneath the outer end of the downwardly and forwardly inclined arm, the lower end of said cylinder being hingedly anchored, a piston slidably mounted in said cylinder, a piston rod carried by said piston and extending upwardly and hingedly connected to the forwardly inclined arm at its outer end, said forwardly inclined arm being pivotally mounted for a rocking operation in a vertical plane, a gear segment carried by said forwardly inclined arm, a rotatable shaft for manual operation of the cross arms when pressure is not being used, a crank carried by said shaft, a pinion rotatably carried by the shaft and meshing with the gear segment, a clutch element carried by the pinion, a clutch element slidably on and rotatable with said shaft, means for supplying pressure to opposite ends of the cylinder, a three-way valve, said three-way valve cooperating with the pressure supply means for reciprocating the piston in the cylinder, a pressure controlled diaphragm a rock lever connection between the diaphragm and the clutch for clutching and declutching operations and means for supplying pressure to the diaphragm through the three-way valve and declutching clutch members after a window adjusting operation.

2. A device as set forth in claim 1 including means for controlling the three-way valve from a position remote in relation to the valve.

PAUL W. WINKELMANN.

REFERENCES CITED

The following references are of record in the file of this patent:

UNITED STATES PATENTS

| Number | Name | Date |
|---|---|---|
| 2,352,140 | Trott | June 20, 1944 |
| 2,365,742 | Brooks | Dec. 26, 1944 |
| 2,417,534 | Wilkison | Mar. 10, 1947 |

FOREIGN PATENTS

| Number | Country | Date |
|---|---|---|
| 345,452 | Great Britain | Mar. 26, 1931 |